(12) United States Patent
Pace et al.

(10) Patent No.: US 8,170,360 B2
(45) Date of Patent: May 1, 2012

(54) METHOD AND SYSTEM FOR ENHANCING IMAGES USING MULTI-RESOLUTION HISTOGRAM SHAPING

(75) Inventors: Teresa L. Pace, Winter Park, FL (US); Richard A. Manville, Winter Springs, FL (US)

(73) Assignee: DRS RSTA, Inc., Dallas, TX (US)

( * ) Notice: Subject to any disclaimer, the term of this patent is extended or adjusted under 35 U.S.C. 154(b) by 786 days.

(21) Appl. No.: 12/275,816

(22) Filed: Nov. 21, 2008

(65) Prior Publication Data

US 2010/0129003 A1 May 27, 2010

(51) Int. Cl.
*G06T 5/00* (2006.01)
(52) U.S. Cl. .................... 382/254; 382/168; 382/302
(58) Field of Classification Search .............. 382/254, 382/168, 302, 260
See application file for complete search history.

(56) References Cited

U.S. PATENT DOCUMENTS

| 2003/0228064 A1* | 12/2003 | Gindele et al. ............ 382/260 |
| 2008/0144962 A1* | 6/2008 | Jung et al. ............... 382/274 |

* cited by examiner

*Primary Examiner* — Jon Chang
(74) *Attorney, Agent, or Firm* — Kilpatrick Townsend & Stockton LLP (57) ABSTRACT

A method for enhancing an image is provided. The method generates a plurality of Gaussian images from the image, and generates a first plurality of Laplacian images from the generated Gaussian images, the plurality of Laplacian images constituting a Laplacian pyramid of images. The method generates a histogram for each of the plurality of Laplacian images, and shapes each of the generated histograms using a predetermined probability density function to produce a second plurality of Laplacian images. The method further combines iteratively each of the second Laplacian images with each of the plurality of Gaussian images expanded at each iteration to generate an enhanced image.

12 Claims, 8 Drawing Sheets

METHOD AND SYSTEM FOR ENHANCING IMAGES USING MULTI-RESOLUTION HISTOGRAM SHAPING

FIELD OF THE INVENTION

The present invention relates, generally, to image processing and, more particularly, to a method and system for enhancing images using multi-resolution histogram shaping.

BACKGROUND OF THE INVENTION

A typical goal of signal processing is to improve the quality and the interpretability of captured or stored images. Infrared or even visible images are candidates for quality improvement when they contain areas having unsatisfactory contrast and/or brightness levels. Changing contrast and/or brightness levels over the whole image does not typically help because only unsatisfactory image areas should be processed so as to keep an amount of signal processing time to a minimum, thereby avoiding tying-up processing resources.

Several approaches or methods have been used to improve contrast and brightness in captured images, and in some of them the improvement turned out to be destructive as a significant amount of desired information ended up being removed from the processed images.

One conventional approach relies on a method to improve the overall image contrast of the processed digital images through the application of a tone scale function, constructed by a mathematical formula that relies on several control parameters. However, this application of the tone scale function amplifies the noise of the resultant processed digital image.

Another conventional approach uses histogram equalization which attempts to improve contrast on the captured or stored images by making the histogram more uniform. This equalization approach redistributes the intensity distributions based on a statistical process. A histogram equalized image brings out additional details that may have been in shadows or overexposed. However, one drawback of the histogram equalization is that some light or dark areas of the images may become saturated, thereby causing some difficulties in seeing details in those areas.

Still another conventional approach for contrast enhancement uses a local area contrast enhancement which pulls details out of bright and dark image areas. However, this local enhancement approach requires that the images be windowed or tiled, thereby increasing the number of operations or amount of processing per pixel.

Therefore, there is a need to remedy the problems noted above and others previously experienced for enhancing contrast and brightness in captured or stored images while minimizing loss of desired information, noise and processing time and resources.

SUMMARY OF THE INVENTION

The foregoing problems are solved and a technical advance is achieved by methods, systems and articles of manufacture consistent with the present invention, which provide enhancement of images having unsatisfactory contrast and/or brightness levels.

In accordance with methods consistent with the present invention, a method for enhancing an image using multi-resolution histogram shaping is provided. The method comprises generating a plurality of Gaussian images from the image, and generating a first plurality of Laplacian images from the generated Gaussian images. The plurality of Laplacian images constitutes a Laplacian pyramid of images. The method further comprises generating a histogram for each of the plurality of Laplacian images, and shaping each of the generated histograms using a predetermined probability density function to produce a second plurality of Laplacian images. The method further combines iteratively each of the second Laplacian images with each of the plurality of Gaussian images expanded at each iteration to generate an enhanced image.

In accordance with systems consistent with the present invention, an image processing system is provided. The system comprises a memory and a processing unit coupled to the memory wherein the processing unit is configured to execute the above noted method steps.

In accordance with articles of manufacture consistent with the present invention, there is provided a computer-readable medium containing a program adapted to cause a data processing system to execute the above-noted method steps. In this regard, the computer-readable medium may be a computer-readable medium, such as solid-state memory, magnetic memory such as a magnetic disk, optical memory such as an optical disk, or a computer-readable transmission medium, such as a modulated wave (such as radio frequency, audio frequency or optical frequency modulated waves) or a modulated downloadable bit stream that may be received by a computer via a network or a via a wireless connection.

Other systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings.

DETAILED DESCRIPTION OF THE PRESENTLY PREFERRED EMBODIMENTS

Reference will now be made in detail to an implementation consistent with the present invention as illustrated in the accompanying drawings. Wherever possible, the same reference numbers will be used throughout the drawings and the following description to refer to the same or like parts. As would be understood to one of ordinary skill in the art, certain components or elements for enhancing images using a multi-resolution histogram shaping are not shown in the figures or specifically noted herein to avoid obscuring the invention.

Figure 1:
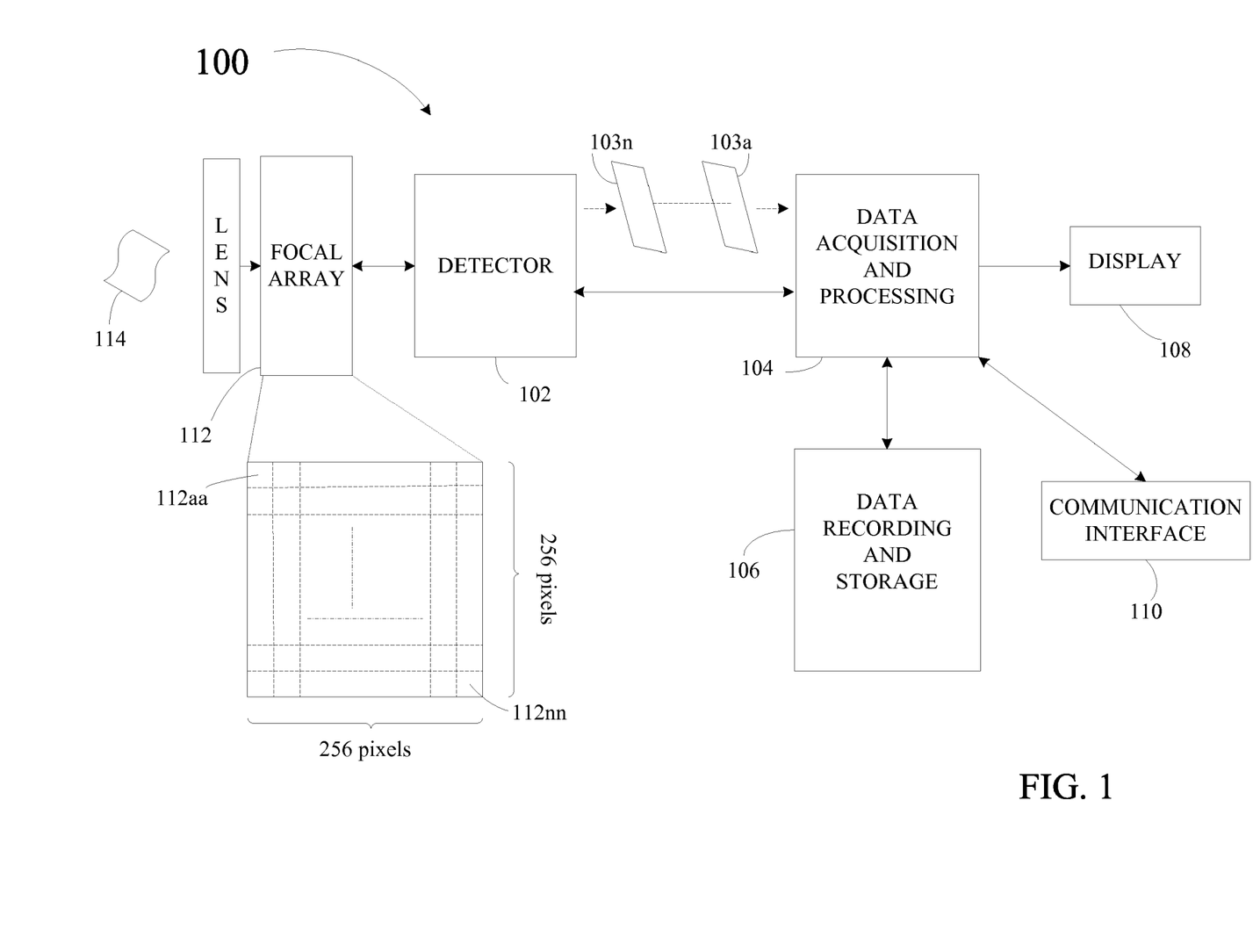
FIG. 1 is a block diagram illustrating one embodiment of an imaging system for enhancing images using multi-resolution histogram shaping in accordance with the present invention.

Referring to FIG. 1, an embodiment of an image processing or imaging system 100 is illustrated in accordance with the present invention. The imaging system 100 includes an image sensing or detection unit 102, an image acquisition and processing unit 104, a data recording and storage unit 106, a display unit 108, and a communication interface unit 110. Alternately, one or more of these devices, such as the display unit 108, may be incorporated into the image acquisition and processing unit 104, hereafter referred to as the processing unit 104.

The detection unit 102, hereafter referred to as the detector, comprises a focal plane array of pixels or photodetectors suitable for detecting an input image (e.g. 103a), such as an infrared image, during an integration and acquisition period, which may be triggered by the image acquisition and processing unit 104. The integration and acquisition period is described in more detail below. In the implementation shown, the detector 102 detects and outputs a sequence of input images 103a-103n, as directed by the image acquisition and processing unit 104.

The detector 102 may include a lens 111 that focuses light emitted or reflected from an object or scene 114 onto the focal plane array 112 of pixels 112aa-112nn. During each acquisition period, each of the pixels 112aa-112nn accumulates a respective portion of the light from the object or scene and generates a corresponding signal or charge based on the intensity of the light. The electrical signals or charges generated by the pixels 112aa-112nn collectively represent an input image 103a-103n which is output by the detector 102 to the processor 104. For purposes of clarity in the discussion, each input image 103a-103n is assumed to correspond to, but not limited to, 256 by 256 pixels.

Figure 2:
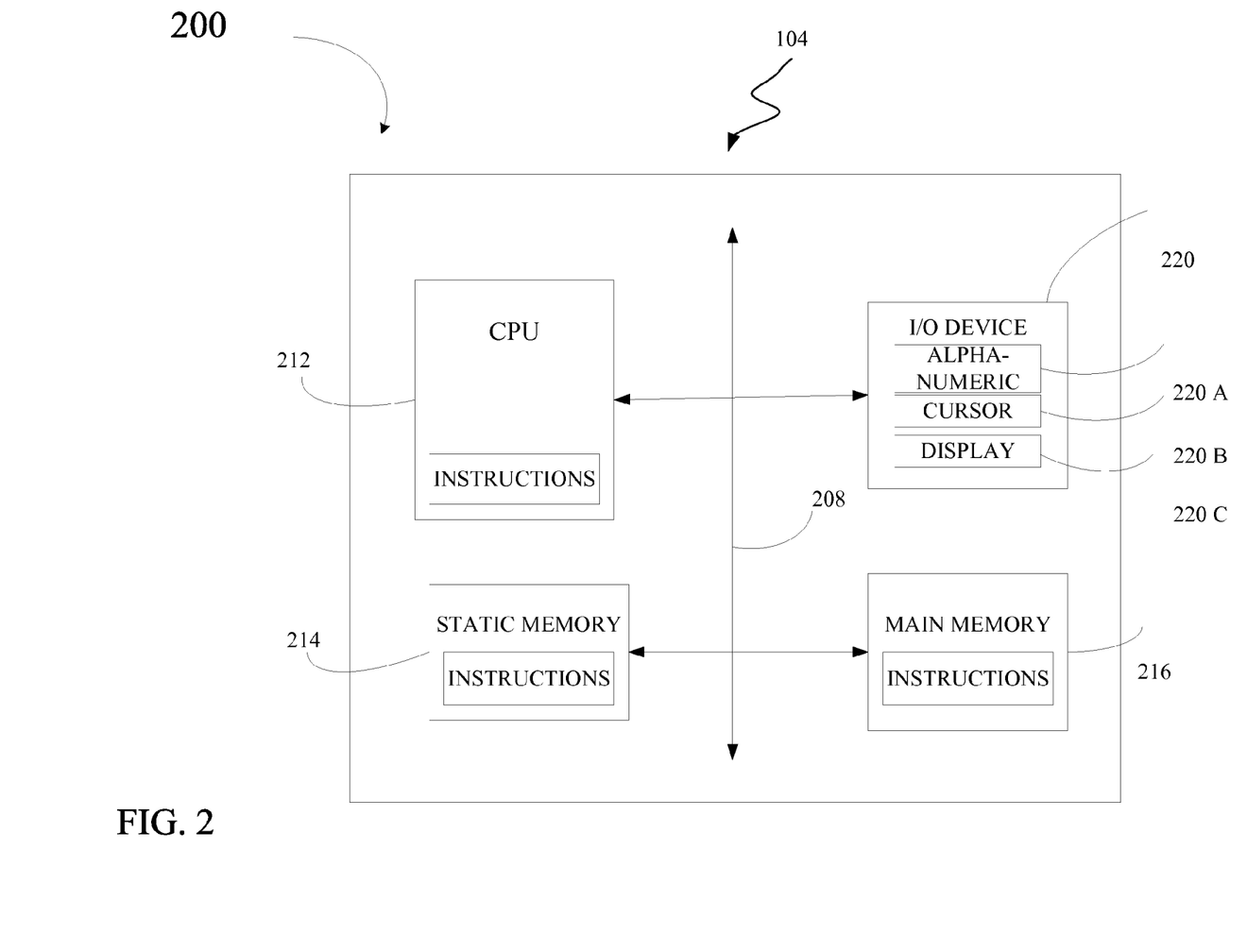
FIG. 2 is a block diagram illustrating a data acquisition and processing unit of employed in the imaging system of FIG. 1 in accordance with the present invention.

The data acquisition and processing unit 104, hereafter referred to as the processor, may be hard-wired circuits or a processor executing a suitable set of program instructions stored on a computer readable storage medium such as a random access memory (RAM), read only memory (ROM), magnetic storage medium (such as magnetic tape, disk or diskette) or optical storage medium (such as compact disk (CD) ROM). As illustrated in FIG. 2, the processor 104 may include a central processing unit (CPU) 212, a static memory 214 and a main memory 216. The CPU 212 is configured to communicate with memory 214 and 216 via bus 218. Additionally, the processor 204 may include an input/output device 220 that may have an alpha-numeric device 220A, such as a keyboard, a cursor control device 220B, such as a mouse, and a video display device 220C, such as a liquid crystal display (LCD), an organic light emitting diode (OLED), a flat panel display, a solid state display, or a cathode ray tube (CRT).

The data recording and storage unit 106 hereafter referred to as the recording/storage memory 106, may comprise any type of memory including random access memory (RAM), electronically erasable memory (EPROM), and the like. Further, the recording/storage memory 106 may comprise any type of storage including magnetic or optical drives, a local drive or a network drive, and a floppy disk, hard drive, CD-ROM, DVD-ROM, DVD-RAM, a tape drive, and the like. The communication interface 110 may comprise any type of interface for connecting to a communication network, such as a data or voice network, a land-line or wireless network, and the like. It will be recognized that one of ordinary skill in the art would understand how to build a communication interface, and hence, further description of this interface is omitted.

Figure 3:
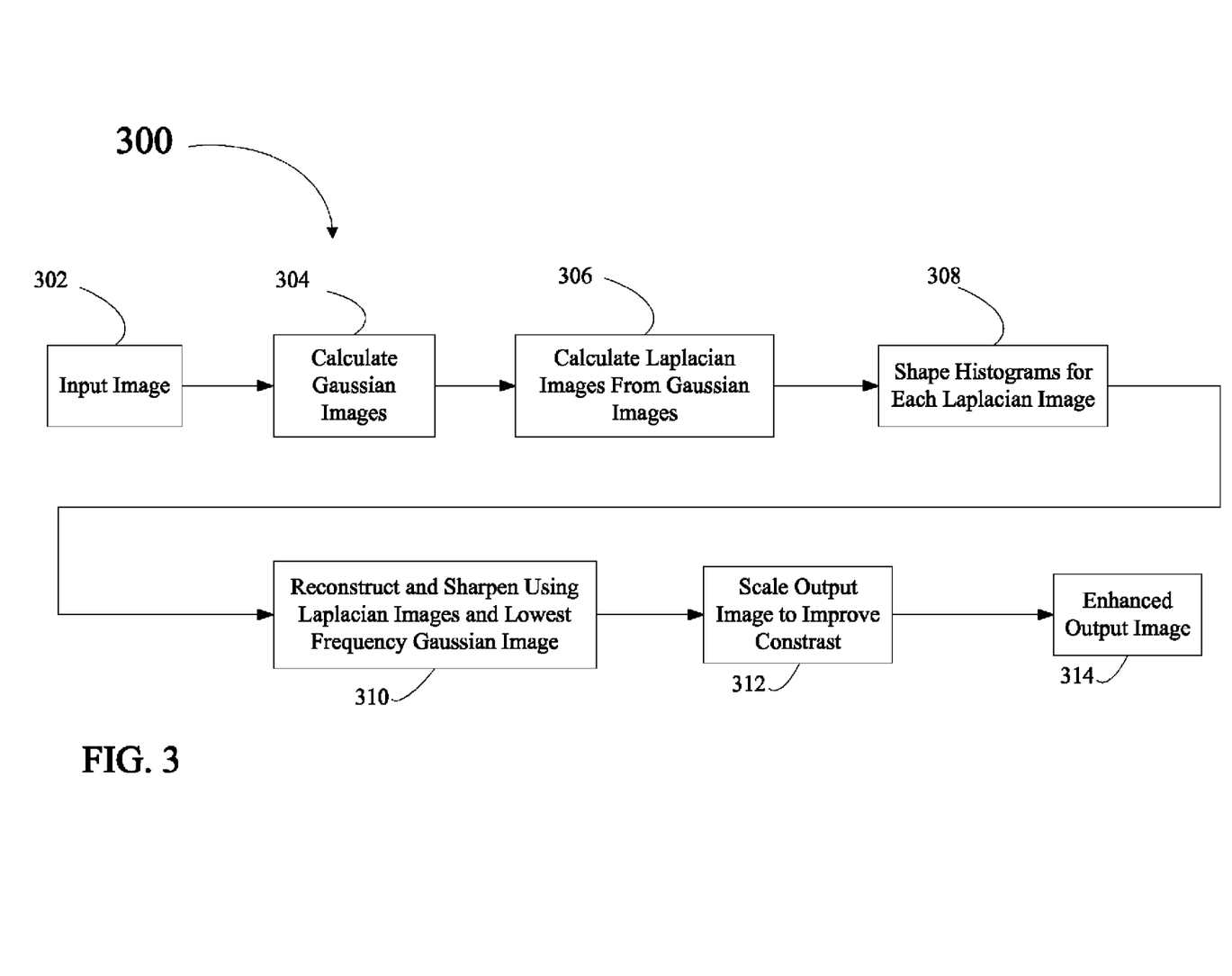
FIG. 3 is a block diagram illustrating a process for enhancing images using multi-resolution histogram shaping performed by the imaging system of FIG. 1 in accordance with the present invention.

Now referring to FIG. 3, a functional block diagram illustrating an exemplary process 300 is shown for enhancing images using multi-resolution histogram shaping performed by the imaging system of FIG. 1. The process 300 is represented by a plurality of functional processing units or steps, provided in an exemplary identified order, which are executed by the processor 104. The illustrative processing units include an input unit 302, a Gaussian image unit 304, a Laplacian image unit 306, a histogram shaping unit 308, an image reconstruction and sharpening unit 310, an image scaling unit 312, and an image output unit 314.

The order of these processing units may of course be varied to the extent an output of one processing unit may not be required as an input of another processing unit. The processing units may be linked or coupled sequentially as shown, or alternatively a subset of these processing units may be run in parallel with another subset. A reduced or streamlined process might adopt fewer processing units, without impacting the intended functionality consistent with the present invention. It should be understood that various aspects of the present application may be used together as would occur to one of ordinary skill in the art without utilizing all of the processing units thereof. In addition, different combinations of these processing units might affect operational speed of the corresponding resulting processes and other intermediary processing outcomes. Accordingly, it should be apparent that other permutations of these processing units may be developed without departing from the spirit and scope of the present invention.

Initially, a set of instructions corresponding to this sequence of processing units is launched on the processor 104. This launching may be performed automatically with activation of the detector 102 or with retrieval of image frames stored in the recording/storage memory 106. The image frames 103a-103n may enter the imaging system 100 at the input unit 302 at real-time rates, or a previously recorded suitable image frame sequence is loaded from the recording/storage memory 106.

Figure 4:
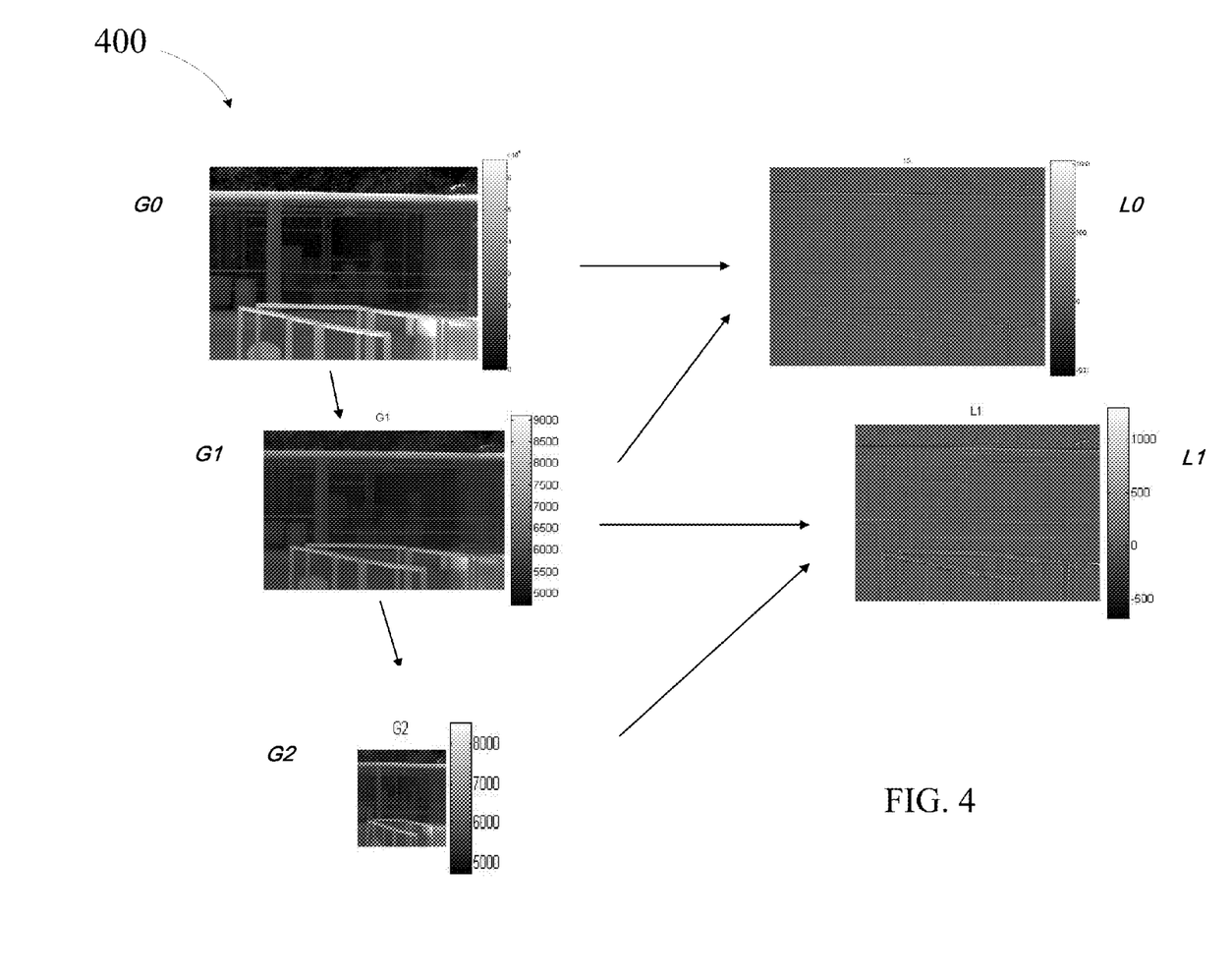
FIG. 4 is a schematic diagram illustrating a Laplacian pyramid decomposition of an image to be enhanced in accordance with the present invention.

Now referring to FIG. 4, a flow diagram 400 illustrates Gaussian and Laplacian pyramid decompositions of an image performed by the Gaussian pyramid image unit 304 and the Laplacian pyramid image unit 306, respectively. Once the image processing is launched by the processor 104, one of the image frames (hereafter referred to simply as image) 103a, for example, captured by the detector 102 or stored in the recording/storage memory 106, is communicated to the Gaussian pyramid image unit 304.

The Gaussian image unit 304 is configured to perform a procedure involving iterative convolutions of the image 103a with a predetermined low-pass filter of the multi-dimensional spatial frequencies of the image 103a. For each iterative convolution, a nominal or cut-off frequency of the low-pass filter characteristics provided in each dimension is chosen to be substantially one-half the highest frequency of interest in that dimension of the image being convolved. The convolved image is downsampled or decimated. In one embodiment, each convolved image is downsampled or decimated by effectively discarding, in each of the respective dimensions of the image successively considered, every other convolved pixel, thereby reducing the number of pixels in the convolved image in each dimension thereof by one-half. Since an image 103a is conventionally a two-dimensional image, a convolved image includes only one-fourth the number of pixels contained in the image 103a due to the convolution. Once an image convolution is completed, this resulting convolved image is called a Gaussian image of the pre-convolution image.

The convolution process, described above, is iteratively performed N times (where N is an integer greater than one (1) thereby resulting in (N+1) images comprised of the original high-resolution input image 103a and a hierarchical pyramid of N reduced or lower resolution Gaussian additional images, wherein the number of pixel samples in each dimension of each additional image is only one-half the number of pixel samples in each dimension of the immediately preceding image. As such, the original image 103a is designated as $G_0$, and the hierarchy of N sequentially or successively produced pyramid of Gaussian images may be respectively designated as $G_1$ through $G_N$, and stored in the recording/storage memory 106 or in memory 214 of the processor 104.

Once produced by the Gaussian image unit 304, the N+1 hierarchical Gaussian pyramidal images, $G_0$ through $G_N$, are communicated to the Laplacian image unit 306. The Laplacian pyramid image unit 306 is configured to generate interpolated value samples between each pair of stored pixel samples in each dimension of an image, thereby expanding the reduced sample density of the stored first Gaussian image $G_1$ back to the sample density of the original stored image $G_0$. The digital value of each of the pixel samples of the expanded first Gaussian image $G_1$ is then subtracted from the stored digital value of the corresponding pixel sample of the original image $G_0$ to provide a difference image or a Laplacian image $L_0$. The Laplacian pyramid image unit 306, in performing the steps of expanding the first Gaussian image $G_1$ and subtracting it from the original stored image $G_0$, exhibits no response to uniform areas or areas with linear gradients, and exhibits a response to changes in gradients. The generation of Laplacian images is, thus, well suited for measuring the contrasts of images to be enhanced.

As such, the Laplacian image $L_0$ may be expressed by the following equation (1):

$$L_0 = G_0 - \text{Expand}(G_1) \qquad (1)$$

The Laplacian image $L_0$ which has the same sample density as the original image $G_0$, is comprised of those spatial frequencies contained in the original image 103a or $G_0$ within the octave $f_0/2$ to $f_0$. In addition, a small lower spatial frequency error-compensating component that corresponds to the loss of information caused respectively by the downsampling step employed in deriving the reduced sample density of the first Gaussian image $G_1$ and in the introduction of interpolated value samples that occurs in expanding the sample density back to that of the original image $G_0$. As such, the produced Laplacian pyramid consists of a hierarchical bandpass filtered (BPF) version of the original image 103a.

In a similar manner, by iterating this Laplacian pyramid procedure, the Laplacian pyramid image unit 306 may generate N-1 additional Laplacian images $L_1$ through $L_{N-1}$, as expressed by the below listed equations (2) and (3):

$$L_1 = G_1 - \text{Expand}(G_2)$$
$$\vdots$$
$$L_{N-1} = G_{N-1} - \text{Expand}(G_N)$$

Figure 5:
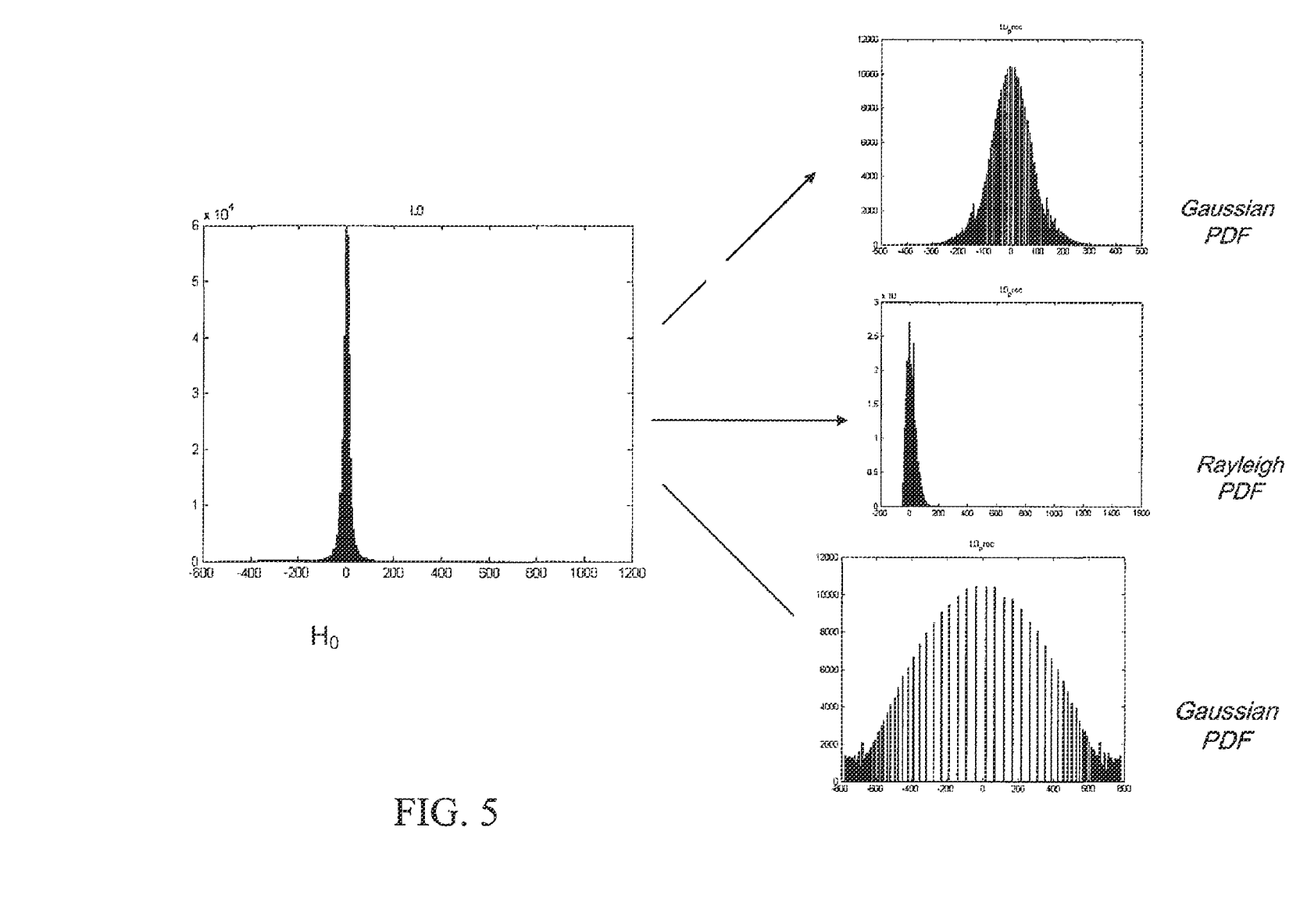
FIG. 5 illustrates examples of probability density function graphs used for shaping histograms of the $L_0$ level of the Laplacian pyramid of the image to be enhanced in accordance with the present invention.

Now referring to FIG. 5, examples of probability density function (PDF) graphs that may be used or generated by the histogram shaping unit 308 used for shaping histograms of the $L_0$ level image or the first Laplacian image $L_0$ of the Laplacian pyramid of the image 103a or $G_0$ are shown. As is fairly known, a histogram may be a plot of pixel intensity values along an x-axis and a number of pixels along a y-axis, so that for a given intensity on the x-axis the histogram plot may indicate how many pixels in an image have that intensity. Accordingly, as shown in FIG. 5 a histogram $H_0$ is generated for the $L_0$ level image by the histogram shaping unit 308. The generated histogram $H_0$ is further manipulated and reshaped by the histogram shaping unit 308 to match a desired cumulative distribution (CDF) evaluated from a PDF of a desired shape. The desired CDF is the cumulative sum or integration of the desired PDF which may be predefined as Gaussian, for example.

Thus, the histogram shaping unit 308 integrates the histogram $H_0$ to produce a corresponding $CDF_0$ (not shown). The produced $CDF_0$ is then matched by the histogram shaping unit 308 to the desired CDF. This CDF matching may be made simpler and faster by using a lookup table. This lookup table is created by identifying a number of CDFs that correspond to a number of desired PDFs. As such, this lookup table mainly serves to match the generated $CDF_0$ to the desired CDF which has the closest histogram sum or integration value. Using the matched CDF, the histogram $H_0$ is essentially shaped to a corresponding $PDF_0$. The matched $PDF_0$ may be selected from a number of well known PDFs, such as Gaussian, Raleigh and Uniform PDFs, among others, as illustrated in FIG. 5. Moreover, a sigma deviation of the histogram $H_0$, which is typically evaluated as a percentage maximum of pixel values of $H_0$, may be used to select a better matching $PDF_0$ that has a substantially similar sigma deviation. Hereafter, the $PDF_0$ is used to derive the corresponding $L_{0\_proc}$, which represents a shaped version of the original $L_0$ level image of the Laplacian pyramid.

Figure 6:
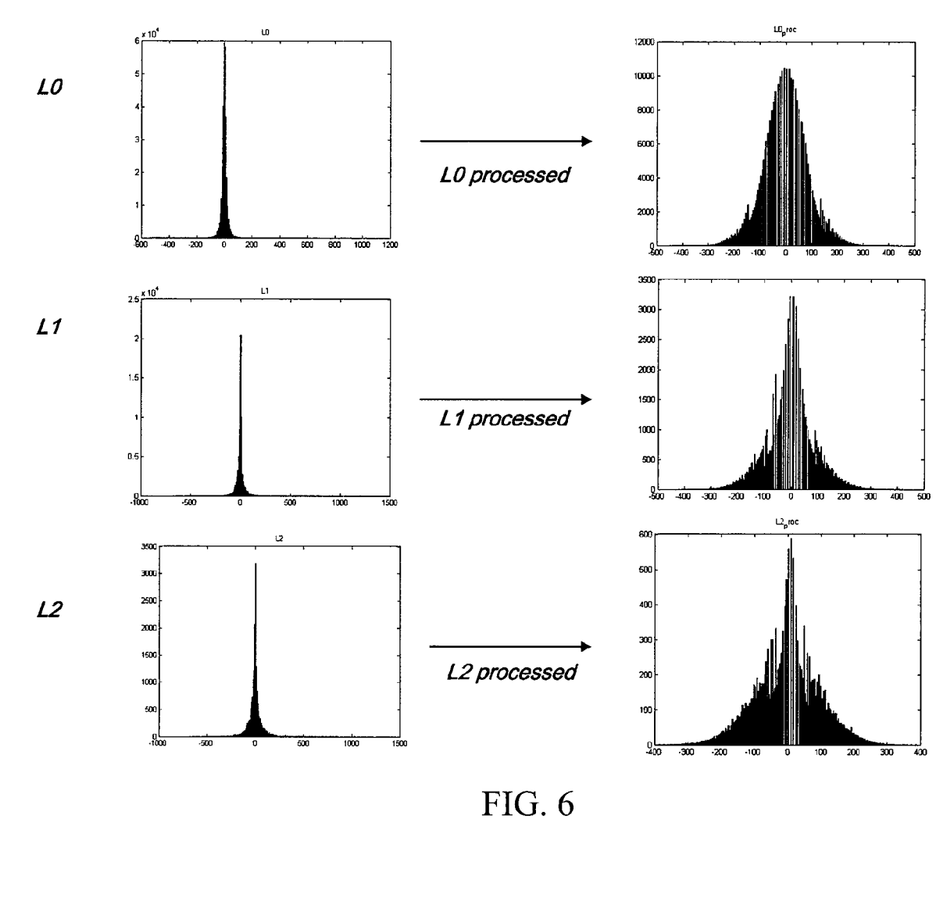
FIG. 6 illustrates histograms of a plurality of Laplacian pyramid levels using a Gaussian probability density function in accordance with the present invention.

Similarly, histograms $H_1$ through $H_{N-1}$ are generated from the other level images of the Laplacian pyramid, $L_1$ through $L_{N-1}$, and then manipulated to generate corresponding PDFs, namely $PDF_1$ through $PDF_{N-1}$, by evaluating corresponding $CDF_1$ through $CDF_{N-1}$ and matching to their closest desired CDFs. Accordingly, the reshaped versions of the histograms $H_1$ through $H_{N-1}$ are generated and then used to derive the corresponding $L_{1\_proc}$ through $L_{N-1\_proc}$ images of the Laplacian pyramid, as illustrated in FIG. 6.

Subsequent to the derivation of the $L_{0\_proc}$ through $L_{N-1\_proc}$ levels of the Laplacian pyramid, the image reconstruction and sharpening unit 310 iteratively recombines the processed Laplacian images $L_{0\_proc}$ through $L_{N-1\_proc}$ with the expanded Gaussian image $\tilde{G}_N$ to produce an enhanced version $G_{0\_rec}$ of the image 103a. This image recombination is an iterative process satisfying the following equations (4)-(7):

$$G_{0\_rec} = L_{0\_proc} + \text{Expand } G_{1\_proc} \quad (4)$$

$$G_{1\_proc} = L_{1\_proc} + \text{Expand } G_{2\_proc} \quad (5)$$

$$G_{2\_proc} = L_{2\_proc} + \text{Expand } G_{3\_proc} \quad (6)$$

$$\vdots$$

$$G_{N-1\_proc} = L_{N-1\_proc} + \text{Expand } G_N \quad (7)$$

Note that the resulting enhanced version of $G_0$, the original image 103a, is the last Gaussian image produced using the above described recombining process, namely $G_{0\_rec}$. Additionally, the generated $G_{0\_rec}$ image may be further sharpened by applying a sharpening factor to the $L_{0\_proc}$ level image of the Laplacian pyramid. An exemplary sharpening of $G_{0\_rec}$ image satisfies the following equation (8):

$$G_{0\_rec} = \text{Sharpen\_factor} * L_{0\_proc} + \text{Expand } G_{1\_proc} \quad (8)$$

This sharpening factor is selectable by the user and is based on the amount of sharpening desired. Although shown above as being applied only to $G_{0\_rec}$, the level zero of the Gaussian decomposition, the sharpening may be applied to the other levels of the Gaussian pyramid as deemed suitable to the desired enhancement of the image 103a. Once sharpened, the $G_{0\_rec}$ image may be scaled to further match a range and a resolution of an intended output image by the image scaling unit 312.

Figure 7:
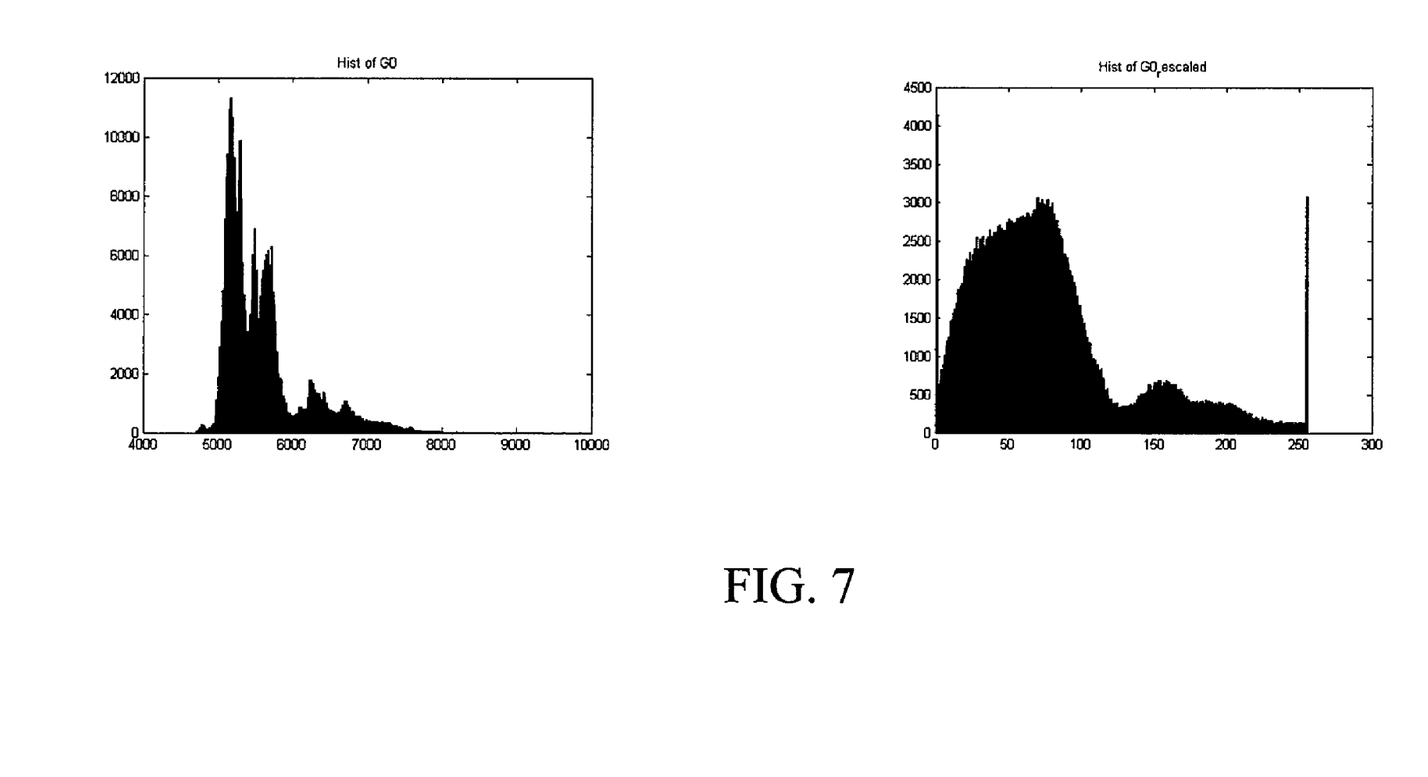
FIG. 7 illustrates histograms of the unprocessed original image and of the corresponding enhanced image in accordance with the present invention.
Figure 8:
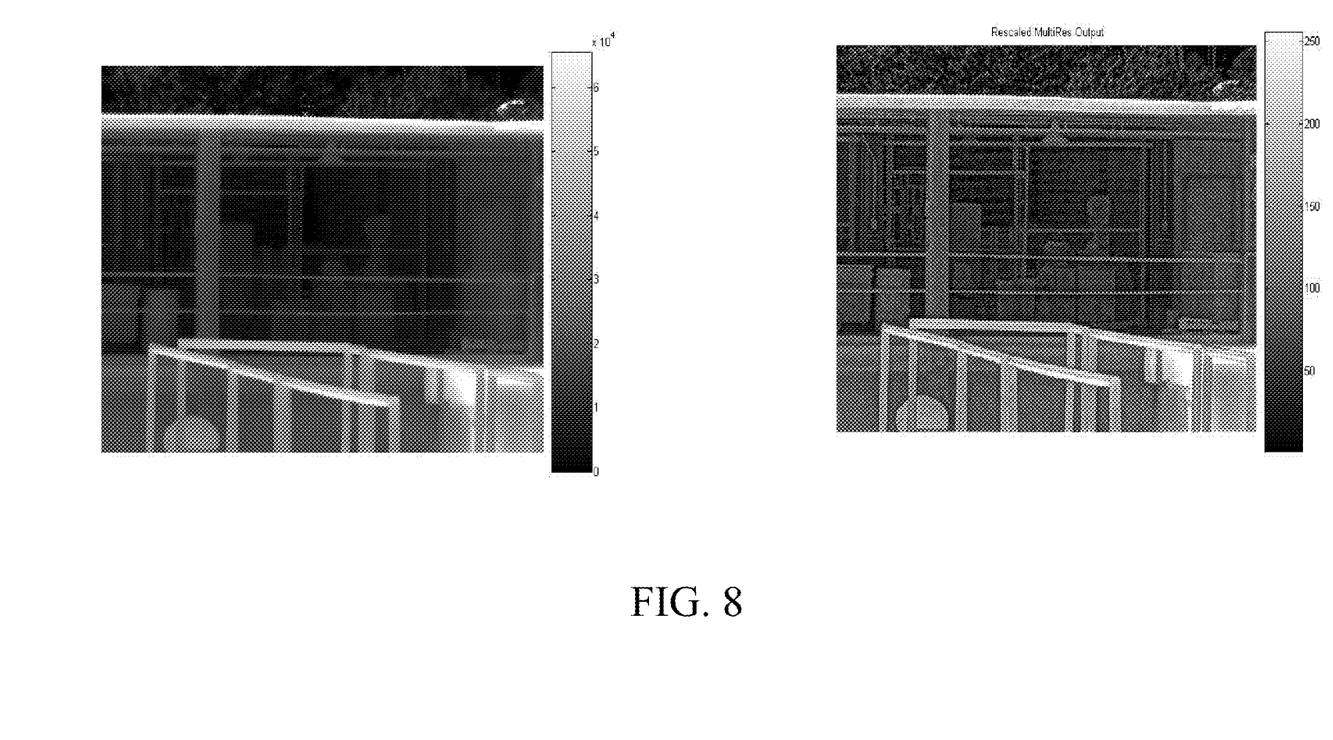
FIG. 8 illustrates examples of the original image and of the corresponding enhanced image in accordance with the present invention.

Additionally, the sharpened and/or scaled $G_{0\_rec}$ image may be clipped to enhance desirable features or details within it by the image scaling unit 312. This clipping is typically performed by providing a threshold level that determines which pixel values remain the same and which are set to this threshold level. Moreover, this $G_{0\_rec}$ image may be subjected to both an upper clipping and a lower clipping. As such, two corresponding threshold levels are determined such that pixel values outside of the interval between the two threshold levels are set to their nearest threshold level while the pixel values within the interval remain the same. Histograms of the $G_0$ and $G_{0\_rec}$ images are illustrated in FIG. 7 and their corresponding original and enhanced images are shown in FIG. 8.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

The invention claimed is:

1. A method for enhancing an image, comprising the steps of:
    generating a plurality of Gaussian images from the image;
    generating a first plurality of Laplacian images from the generated Gaussian images, the plurality of Laplacian images constituting a Laplacian pyramid of images;
    generating a histogram for each of the plurality of Laplacian images;
    integrating each of the histograms to produce a corresponding cumulative distribution function;
    matching each of the produced cumulative distribution functions to a desired cumulative distribution function;
    generating a desired probability density function for each histogram based on the desired cumulative distribution function;
    shaping each of the histograms to match their corresponding generated probability density functions to produce a second plurality of Laplacian images; and
    combining iteratively each of the second Laplacian images with each of the plurality of Gaussian images expanded at each iteration to generate an enhanced image.

2. The method for enhancing an image according to claim 1, further comprising:
    determining a sigma deviation of at least of one the generated histograms to match the produced cumulative distribution function to a desired cumulative distribution function having a substantially similar sigma deviation.

3. The method for enhancing an image according to claim 1, wherein the generated enhanced image is further sharpened by multiplying at least one of the second Laplacian images by a sharpening factor.

4. The method for enhancing an image according to claim 1, wherein the generated enhanced image is further enhanced by a clipping process that utilizes at least one of an upper and a lower threshold.

5. A non-transitory computer-readable medium containing a computer program adapted to cause a computer to execute a method for enhancing an image, the method comprising the steps of:
    generating a plurality of Gaussian images from the image;
    generating a first plurality of Laplacian images from the generated Gaussian images, the plurality of Laplacian images constituting a Laplacian pyramid of images;
    generating a histogram for each of the plurality of Laplacian images;
    integrating each of the histograms to produce a corresponding cumulative distribution function;
    matching each of the produced cumulative distribution functions to a desired cumulative distribution function;
    generating a desired probability density function for each histogram based on the desired cumulative distribution function;
    shaping each of the histograms to match their corresponding generated probability density functions to produce a second plurality of Laplacian images; and
    combining iteratively each of the second Laplacian images with each of the plurality of Gaussian images expanded at each iteration to generate an enhanced image.

6. The non-transitory computer-readable medium according to claim 5, further comprising:
    determining a sigma deviation of at least of one the generated histograms to match the produced cumulative distribution function to a desired cumulative distribution function having a substantially similar sigma deviation.

7. The non-transitory computer-readable medium according to claim 5, wherein the generated enhanced image is further sharpened by multiplying at least one of the second Laplacian images by a sharpening factor.

8. The non-transitory computer-readable medium according to claim 5, wherein the generated enhanced image is further enhanced by a clipping process that utilizes at least one of an upper and a lower threshold.

9. An imaging system, comprising:
    an image detection unit; and
    an image acquisition unit in communication with the image detection unit, and having a memory and a processing unit coupled to the memory, wherein, the processing unit is configured to execute the steps of:

generating a plurality of Gaussian images from the image;

generating a first plurality of Laplacian images from the generated Gaussian images, the plurality of Laplacian images constituting a Laplacian pyramid of images;

generating a histogram for each of the plurality of Laplacian images;

integrating each of the histograms to produce a corresponding cumulative distribution function;

matching each of the produced cumulative distribution functions to a desired cumulative distribution function;

generating a desired probability density function for each histogram based on the desired cumulative distribution function;

shaping each of the histograms to match their corresponding generated probability density functions to produce a second plurality of Laplacian images; and combining iteratively each of the second Laplacian images with each of the plurality of Gaussian images expanded at each iteration to generate an enhanced image.

10. The imaging system according to claim 9, further comprising:

determining a sigma deviation of at least of one the generated histograms to match the produced cumulative distribution function to a desired cumulative distribution function having a substantially similar sigma deviation.

11. The imaging system according to claim 9, wherein the generated enhanced image is further sharpened by multiplying at least one of the second Laplacian images by a sharpening factor.

12. The imaging system according to claim 9, wherein the generated enhanced image is further enhanced by a clipping process that utilizes at least one of an upper and a lower threshold.

* * * * *